United States Patent [19]

Kokaji

[11] 4,161,738

[45] Jul. 17, 1979

[54] METHOD AND APPARATUS FOR RECORDING LATENT IMAGES FOR MAGNETOGRAPHY

[75] Inventor: Norio Kokaji, Tokyo, Japan

[73] Assignee: Iwatsu Electric Co., Ltd., Tokyo, Japan

[21] Appl. No.: 875,010

[22] Filed: Feb. 3, 1978

[30] Foreign Application Priority Data

Feb. 10, 1977 [JP] Japan ................................ 52-13957

[51] Int. Cl.² ........................ G03G 19/00; G11B 5/09

[52] U.S. Cl. .................................. 346/74.1; 358/301; 360/41

[58] Field of Search ....................... 346/74.1; 358/301; 360/41

[56] References Cited

U.S. PATENT DOCUMENTS

| | | | |
|---|---|---|---|
| 3,012,232 | 12/1961 | Eckert | 346/74.1 |
| 3,823,405 | 7/1974 | Andreaggi | 346/74.1 |
| 3,986,190 | 10/1976 | Schwabe | 346/74.1 |
| 4,072,957 | 2/1978 | Kokaji | 346/74.1 |

*Primary Examiner*—Jay P. Lucas
*Attorney, Agent, or Firm*—Merchant, Gould, Smith, Edell, Welter & Schmidt

[57] ABSTRACT

Disclosed is a method wherein, in order to prevent background stains in the conventional NRZ system latent image recording method for Magnetography, the latent image recording is effected in such a manner that, in response to a black color representation signal, the direction of the magnetizing field along a generated magnetizing track is periodically reversed, while in response to a white color representation signal, a saturation magnetizing field of a uniform predetermined polarity is applied to adjacent tracks lying in a white region of the signal.

4 Claims, 19 Drawing Figures

METHOD AND APPARATUS FOR RECORDING LATENT IMAGES FOR MAGNETOGRAPHY

BACKGROUND OF THE INVENTION

This invention relates to a method of recording latent images for Magnetography, and more particularly to an improvement in a method of recording latent images by the Non Return to Zero system (hereinafter referred to as "NRZ system") magnetic recording method.

For recording magnetic latent images on a surface of a recording drum made of magnetic recording medium, the main scanning is effected around the axis of the drum and the subsidiary scanning is effected along the axis of the drum. The width of each track of the main scanning is equal to the width of the recording head.

After recording the magnetic latent images of the character, a magnetic toner is scattered on the latent images, in order to turn the latent images into visible images, so that the character becomes visible in black color. However, simultaneously with the appearance of the character, fine black lines are often observed along the borderlines between tracks generated by the recording head. This appearance of fine black lines, which is called background stain, is an undesirable phenomenon and has been considered to be unavoidable due to the nature of the NRZ system magnetic recording.

In order to overcome the disadvantages due to the above mentioned phenomenon, according to the present invention, an improvement in the conventional NRZ system magnetic recording method in response to the picture signals representing black and white color makes it possible to prevent the appearance of background stains.

SUMMARY OF THE INVENTION

It is an object of the present invention to provide a method for recording latent images for Magnetography, using the improved NRZ system magnetic recording method, which does not cause any background stain in a printed picture.

It is another object of the present invention to provide a method for recording latent images for Magnetography which ensures clear discrimination between black and white parts in a printed picture.

It is still another object of the present invention to provide an apparatus for recording latent images for Magnetography, using the improved NRZ system magnetic recording method, in which a picture signal representing black or white color is produced by an electronical logic circuitry.

DETAILED DESCRIPTION OF THE INVENTION

Figure 1:
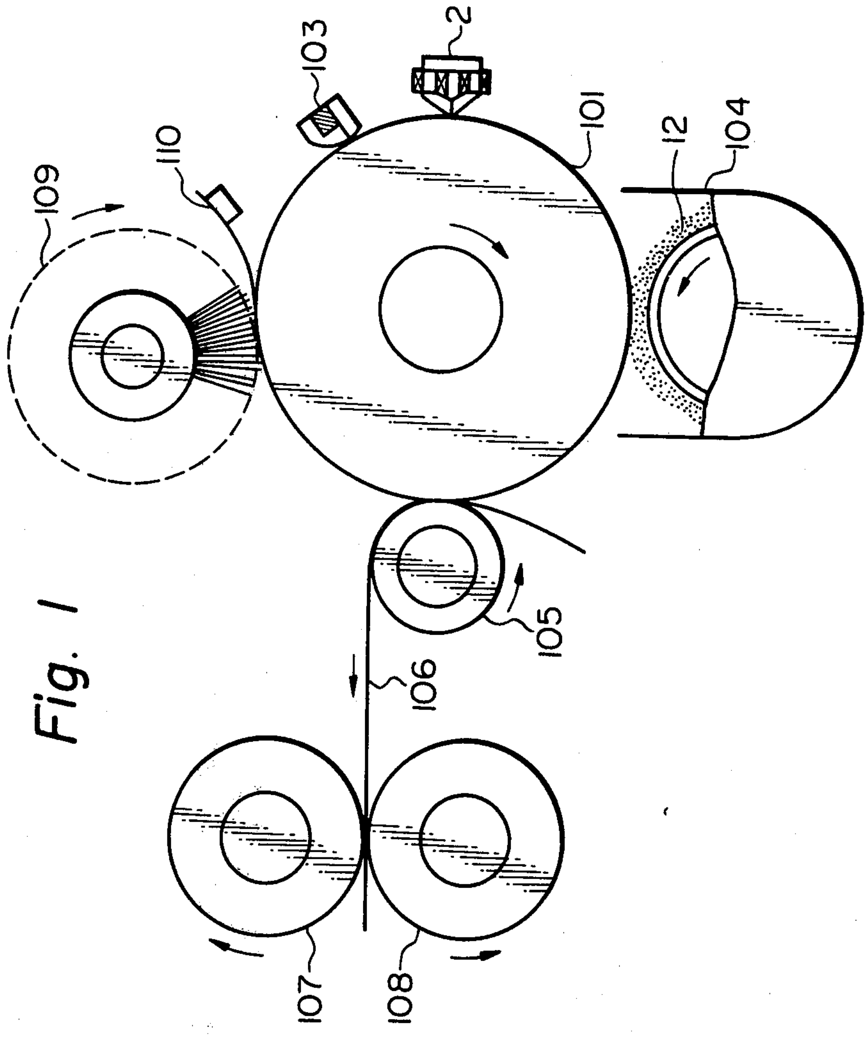
FIG. 1 shows an overall system of a Magnetogrphy apparatus to which the present invention is to be applied.

Referring to FIG. 1, a recording drum 101, on the surface of which a coating of a magnetic recording medium such as Co-Ni-P and of a non-magnetic protecting medium such as Ni-p are arranged, rotates in the clockwise direction. A magnetic recording head 2 records magnetic latent images of a picture on the recording drum 101. The magnetic recording head 2 effects the main scanning around the circumference of the drum 101 and subsidiary scanning along the axis direction of the drum 101 on the surface thereof.

Magnetic latent images are turned into visible images by a magnetic toner 12 which is attracted to the surface of the drum 101 according to the pattern of residual magnetization in the magnetic medium, and said visible images formed by the toner are transferred to a recording paper 106 on a transferring roller 105. The transferred images are permanently fixed on the recording paper 106 by heat or pressure by means of the fixing rollers 107 and 108. After the transfer, the remaining magnetic toner on the recording drum 101 is removed by a cleaning brush 109 and a cleaning blade 110. To erase the recorded latent images on the recording drum 101 an erase head 103 is provided.

Figure 5:
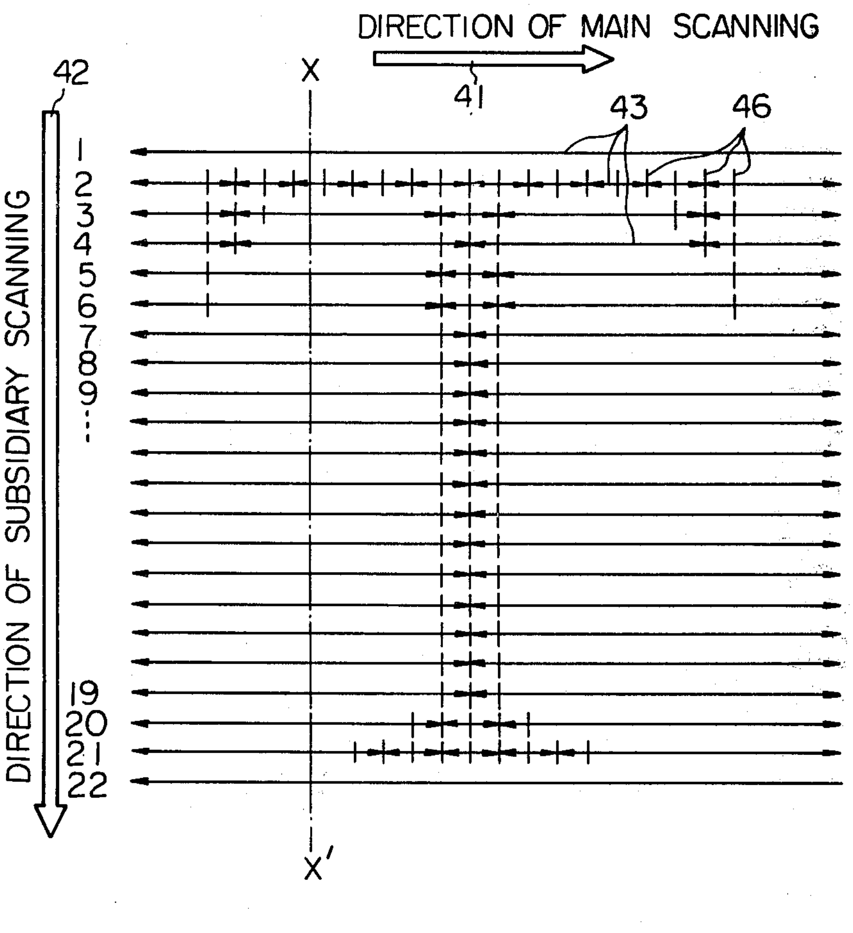
FIG. 5 and FIG. 6 illustrate the conventional NRZ system magnetic recording method with regard to the recording of the character shown in FIG. 4.
Figure 6:
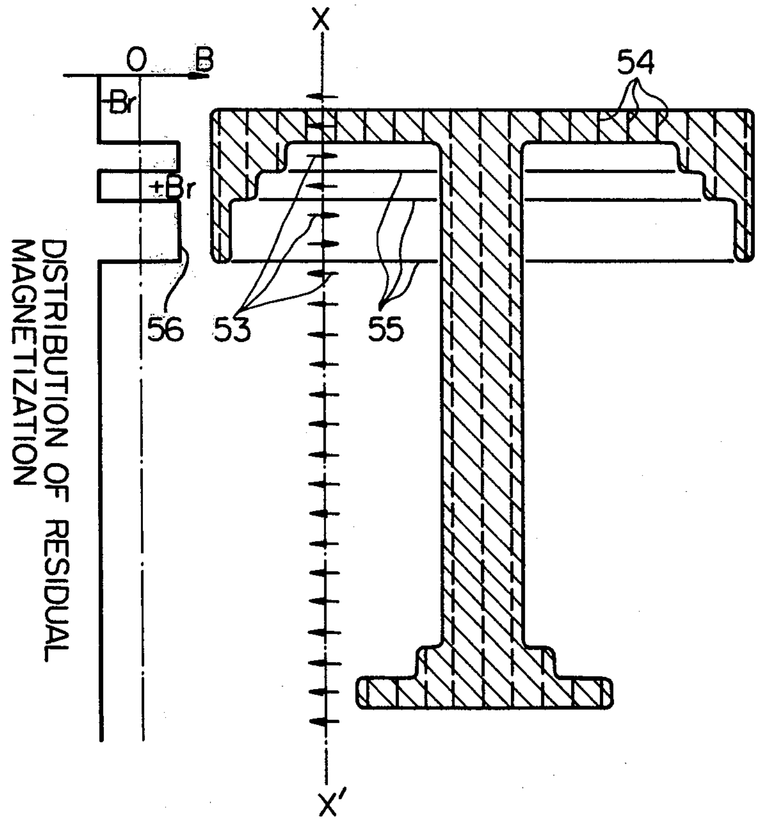

Referring to FIG. 5 and FIG. 6, the reason background stains appears in the conventional NRZ system magnetic recording method will now be explained. In the conventional NRZ system magnetic recording method, assuming the black color representation picture signal corresponds to an electrical signal of logic 1 and the white color representation picture signal corresponds to an electrical signal of logic 0, the magnetizing field is reversed for the input signal of logic 1 and the magnetizing field is maintained in the previous state for the input signal of logic 0.

Figure 4:
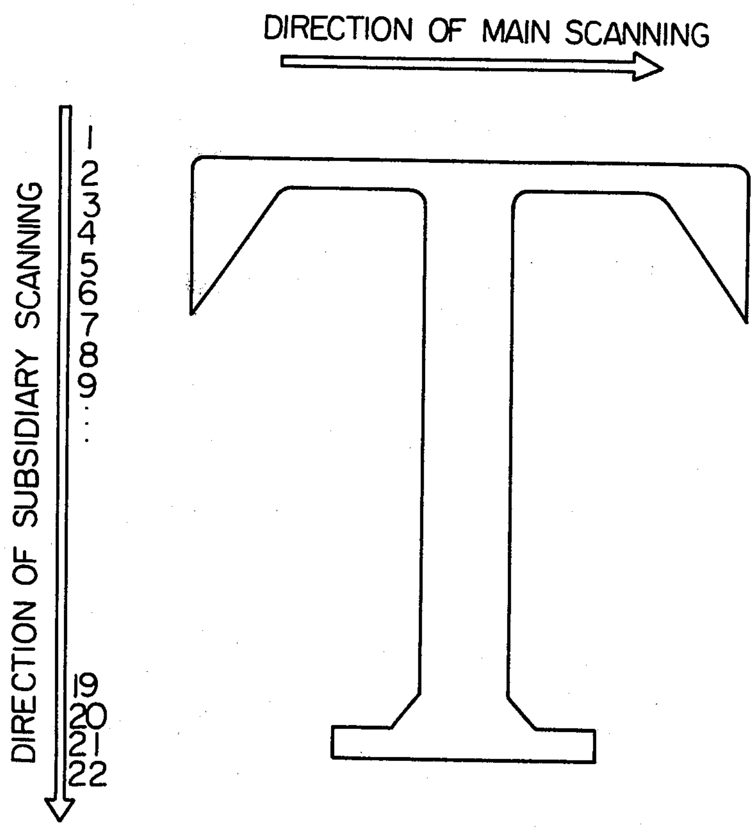
FIG. 4 shows a character "T", as an example, which is to be reproduced by Magnetography as illustrated in FIG. 5 through 8.

FIG. 5 shows the pattern of the residual magnetization on the surface of the recording drum for an alphabetical character "T" shown in FIG. 4. The main scanning and the subsidiary scanning are effected in directions 41 and 42, respectively. The pattern of residual magnetization is expressed by arrows 43 and the positions of reversals of the direction of said arrows are indicated by marks 46.

A visible image of the character "T" is obtained as shown in FIG. 6 by applying the magnetic toner over the latent images of FIG. 5. The points of magnetization reversal 46 attract the magnetic toner so that a visible character "T" in black color appears. However, as described hereinbefore, fine black lines 55 appear along the border lines between some of the main scanning tracks as shown in FIG. 6. These fine black lines 55 are called background stain. The reason for the appearance of said lines will now be explained.

The distribution of the direction of the residual magnetization along the line X–X' in FIG. 5 is illustrated by arrows 53 indicated along the line X–X' in FIG. 6. Because the signal of logic 0, which represents white color, causes the maintenance of the magnetizing field in the previous state, the state of residual magnetization corresponding to the signal of logic 0 can either be +Br or −Br in accordance with the previous state, where +Br and −Br represent the saturation residual magnetization in each polarity respectively. The distribution of the residual magnetization along the line X–X′ is also shown in the graphic line 56 in FIG. 6. Accordingly, the directions of arrows 53 in white color portion of the picture along the line X–X′ are not uniform but turn over from left-directed (−Br) to right-directed (+Br), or from right-directed (+Br) to left-directed (−Br), as shown in FIG. 6. Therefore, upon applying the magnetic toner over these white color portion, the magnetic toner is attracted even to the border lines 55 of the main scanning tracks where the directions of the residual magnetization turn over as mentioned above.

The present invention provides an improved method for recording latent images for Magnetography, using the NRZ system magnetic recording method, which does not cause any background stain in a printed picture. In view of the fact that the background stain is the result of the existence of two states, +Br and −Br, for the white color signal, according to the present invention, the white color signal region is made to correspond always to the residual magnetization of a single uniform predetermined polarity, for example −Br.

Figure 2:
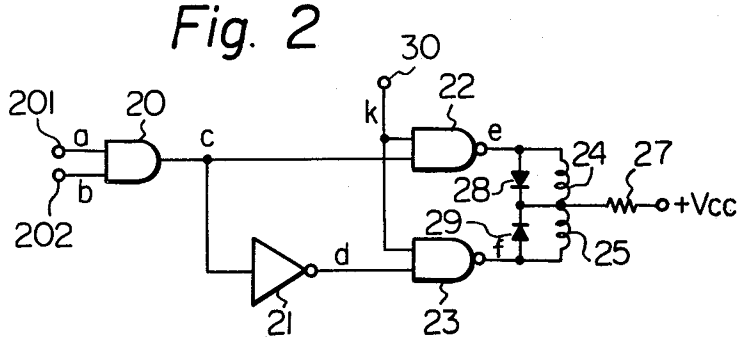
FIG. 2 shows an example of a logic circuitry for producing a magnetizing current for forming magnetic latent images according to the present invention.
Figure 3:
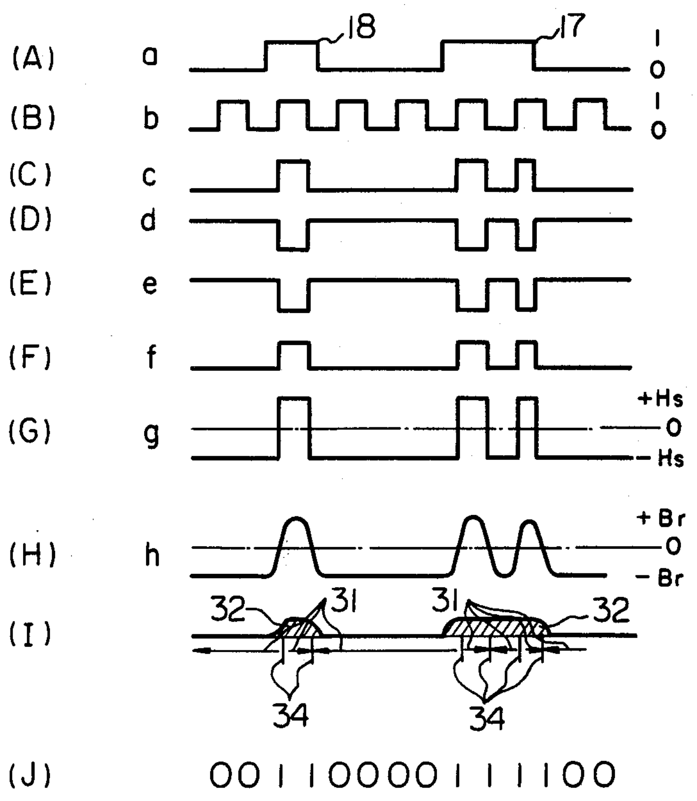
FIGS. 3(A)–(J) show the characteristics of operation of the logic circuitry shown in FIG. 2.

The logic circuitry which enables the above mentioned magnetization according to the present invention is shown FIG. 2. The characteristics of the operation of the circuitry of FIG. 2 are shown in FIG. 3. FIG. 3(A) shows the wave form of a picture signal "a", in which the upper level is logic 1 corresponding to the black color and the lower level is logic 0 corresponding to the white color. FIG. 3(B) shows a clock pulse "b". FIG. 3(C) shows an output "c" of an AND-gate 20. FIG. 3(D) shows an output "d" of an inverter 21. FIG. 3(E) shows an output "e" of a NAND-driver 22 which is fed to a magnetizing coil 24 of the recording head 2. FIG. 3(F) shows an output "f" of a NAND-driver 23 which is fed to a magnetizing coil 25. FIG. 3(G) shows a recording magnetic field "g" by the recording head. FIG. 3(H) shows a residual magnetization "h" in the magnetic medium of the recording drum. FIG. 3(I) shows an attracted magnetic toner 32 according to a residual magnetization pattern indicated by arrows 31. FIG. 3(J) shows a logic pattern of a picture.

Referring to FIG. 2 and FIG. 3, the AND-gate 20, which receives inputs of the picture signal "a" and the clock pulses "b", produces the signal "c" at its output. The NAND-driver 22 receives the signal "c" and puts out the signal "e" which is applied to the magnetizing coil 24 of the recording head so as to produce a saturation magnetizing field +Hs. The inverter 21 inverts the signal "c" into the signal "d" which is applied to the NAND-driver 23. The output signal "f" of the NAND-driver 23 is applied to the magnetizing coil 25 of the recording head so as to produce a saturation magnetizing field −Hs. A power source +Vcc, resistor 27, and fly-back absorbing diodes 28 and 29 are provided in the circuitry. Accordingly current is always supplied to either of the coils 24 and 25. On the magnetic medium of the recording drum, the residual magnetization "h" remains as a result of the magnetizing field +Hs or −Hs, which is produced by the magnetizing current "e" or "f". The magnetic toner 32 is attracted to the positions 34 of the reversal of the direction of the residual magnetiziation 31. The inhibiting signal "k" is applied to an input terminal 30 of the NAND-drivers 22 and 23 so as to shut off the NAND-drivers 22 and 23 and stop the magnetizing current in a case where the latent image recording process is over and toner application as well as image transfer are going on.

Figure 7:
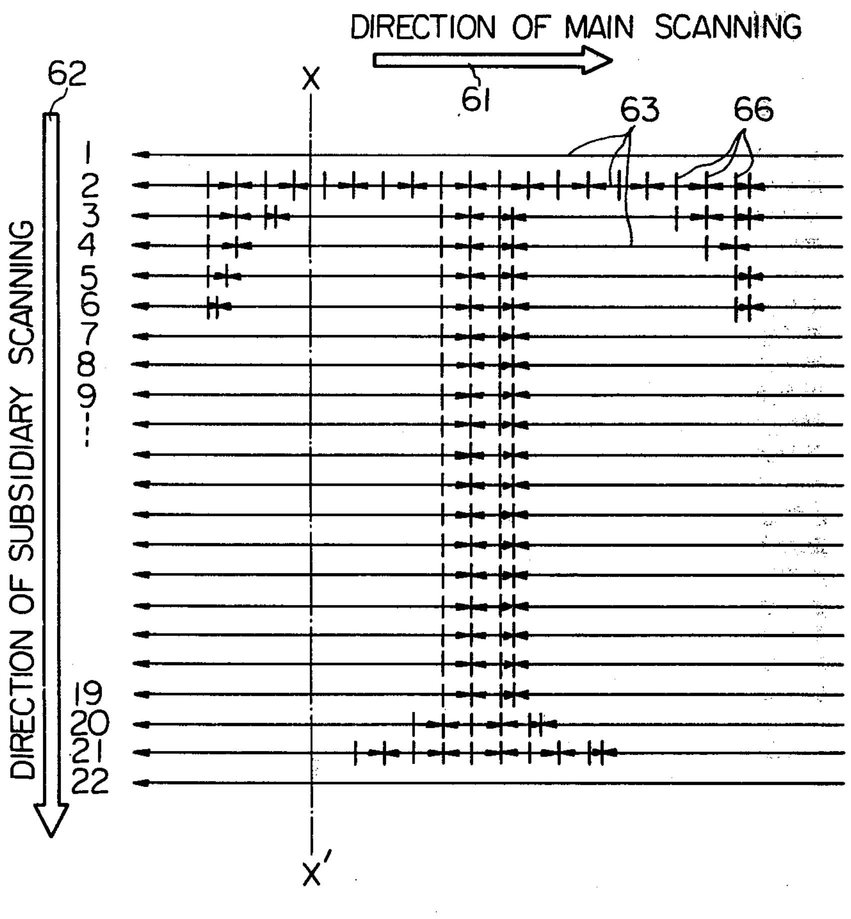
FIG. 7 and FIG. 8 illustrate the improved NRZ system magnetic recording method according to the present invention with regard to the recording of the same character as shown in FIG. 5 and FIG. 6.

The pattern of the residual magnetization of a character "T" according to the circuit shown in FIG. 2 is shown in FIG. 7. A visible image of the character "T" is obtained as shown in FIG. 8 by applying the magnetic toner over the latent images of FIG. 7.

Figure 8:
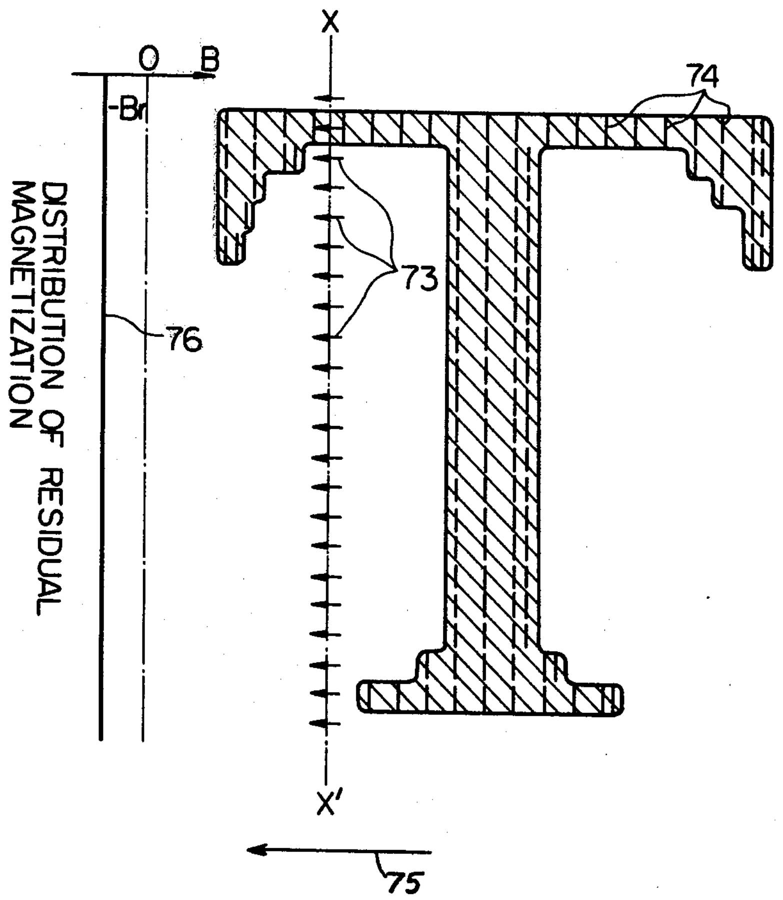

The distribution of the direction of the residual magnetization along the line X–X′ in FIG. 7 is illustrated by arrows 73 indicated along the line X–X′ in FIG. 8. The directions of the arrows 73 in the white color portion of the picture along the line X–X′ are uniform as all of these arrows are directed to the left. The distribution of the residual magnetization along the line X–X′ is also shown in the graphic line 76 in FIG. 8. The residual magnetization in the white color portion is constantly equal to −Br. Because there exists no turning-over of the direction of the arrows 73, the attraction of the magnetic toner does not occur. Therefore, no background stain appears in the case illustrated in FIG. 7 and FIG. 8.

Figure 9:
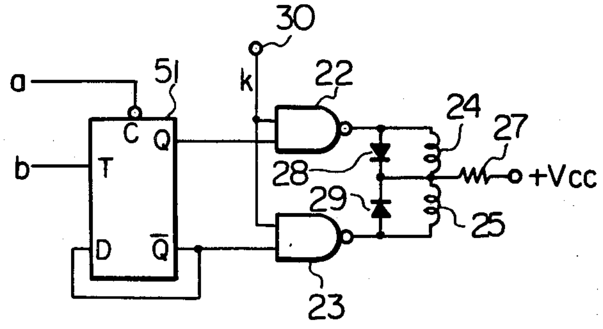
FIG. 9 and FIG. 10 show other examples of logic circuitry for producing a magnetizing current for forming magnetic latent images according to the present invention.
Figure 10:
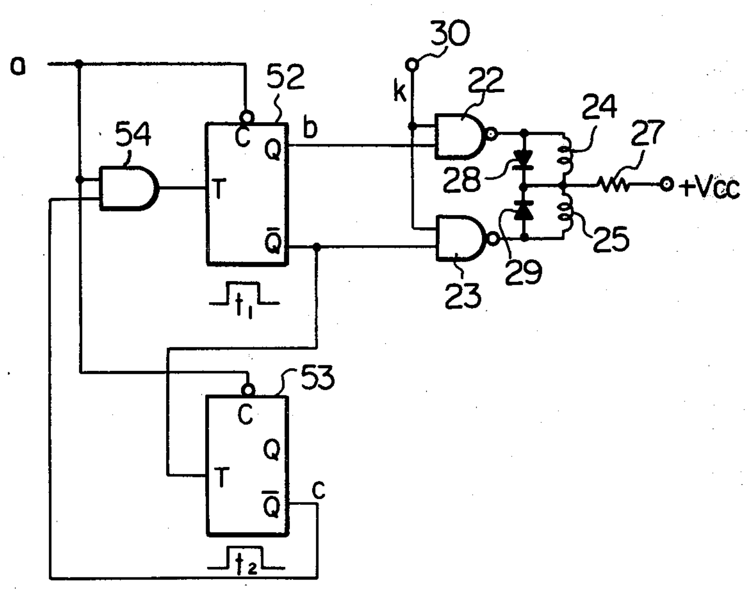

The alternative electronical logic circuitries according to the present invention are shown in FIG. 9 and FIG. 10.

In FIG. 9, a D-type flip-flop circuit (D-FF) 51, such as an "SN7474N" of Texas Instruments Co., is used. The picture signal is applied to a clear-terminal C. The clock pulse is applied to a trigger-terminal T. While the picture signal is logic 1, the clock pulse turns over the D-FF so that the magnetizing field oscillates between +Hs and −Hs. While the picture signal is logic 0, the D-FF is cleared so that the magnetizing field is maintained as −Hs. The output signal of the side of logic 1 is produced at a Q-terminal, and the output signal of the side of logic 0 is produced at a Q-terminal.

In FIG. 10, one-shot circuits (OS) 52 and 53, such as an "SN74221N" of the Texas Instruments Co., is used. While the picture signal is logic 1, OS 52 and 53 are triggered alternately so that the magnetizing field oscillates between +Hs and −Hs.

Hereinbefore the descriptions referred to the background stain appearing on the border lines between the main scanning tracks. However, a similar problem arises with regard to the erasing of the recorded latent images. That is, in Magnetography of the type in which the skipping-over of the vacant space between record tracks is adopted for speeding up the recording, it is necessary to erase the entire surface of recording drum prior to any new recording in order to carry out a new recording on the recorded drum. The erasing is effected by the erase head 103 shown in FIG. 1. If the erasing is carried out by using a uni-directional magnetizing field +Hs, or an alternate-directional magnetizing field, background stains appear along the border line between the white color portion of the record region and the white color skip region due to the difference in the direction of the residual magnetization. This is because the white color is represented by the residual magnetization −Br in the record region, and by the residual magnetization +Br or zero in the skip region.

According to the present invention, the erasing is carried out by applying a uni-directional magnetizing field −Hs. The direction of said uni-directional magnetizing field is as indicated by arrow 75 in FIG. 8. The white colors both in the record region and the skip region correspond to the same residual magnetization of —Br. Accordingly, there exists no reversal of the direction of magnetization between said two regions. Therefore, no background stains appear in the printed picture.

What is claimed is:

1. A method of recording magnetic latent images in a magnetic recording medium for Magnetography in response to picture signals, said recording medium being receptive to imposition of a multiplicity of generally parallel, polarized magnetizing tracks by a magnetic recording head, said method comprising a step of applying a periodically reversing magnetizing field to said medium in response to a picture signal of black color in order to generate a track thereon having a periodically reversing magnetic polarity, and a step of applying a saturation magnetizing field of uniform predetermined polarity to said medium in response to a white color picture signal in order to generate tracks of uniform polarity in regions of said recording medium representing white color regions of the recorded picture.

2. A method of Magnetography according to claim 1, wherein erasure of the recorded latent images is effected by applying a saturation uni-directional magnetic field of the same polarity as the polarity of the residual magnetization corresponding to a picture signal of white color.

3. An apparatus for recording magnetic latent images in a magnetic recording medium for Magnetography in response to picture signals, said recording medium being receptive to imposition of a multiplicity of generally parallel, polarized magnetizing tracks by a magnetic recording head, said apparatus comprising means for generating a sequence of repeated pulses, and means for applying a current to the recording head to apply a periodially reversing magnetizing field to said medium in response to a black color picture signal in order to generate a track thereon having a periodically reversing magnetic polarity, and to apply a saturation magnetizing field of uniform predetermined polarity to said medium in response to a white color picture signal in order to generate tracks of uniform polarity in regions of said recording medium representing white color regions of the recorded picture.

4. An apparatus for Magnetography according to claim 3, further comprising means for energizing an erase head so that said erase head generates a magnetizing field of the same polarity as the polarity of the residual magnetization corresponding to a picture signal of white color.

* * * * *